S. T. WALKUP.
AUTOGUBERNATOR.
APPLICATION FILED JULY 30, 1917.
1,378,740. Patented May 17, 1921.
3 SHEETS—SHEET 2.
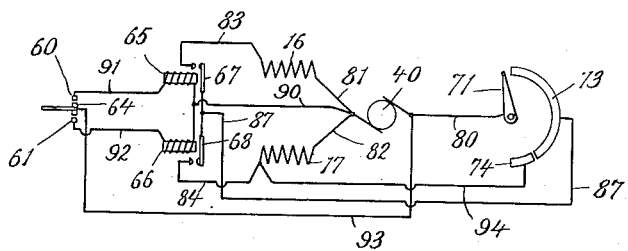
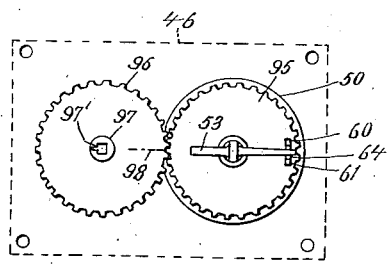
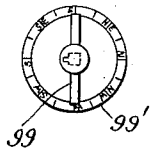
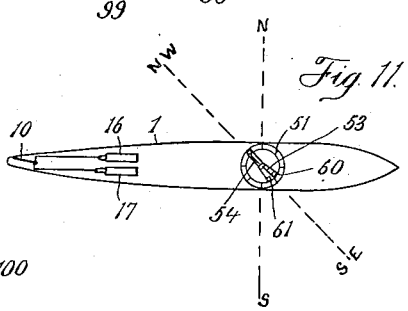
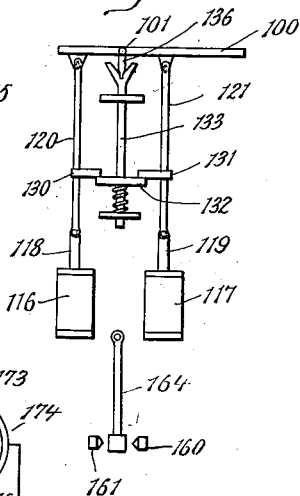
INVENTOR
Samuel Thomas Walkup

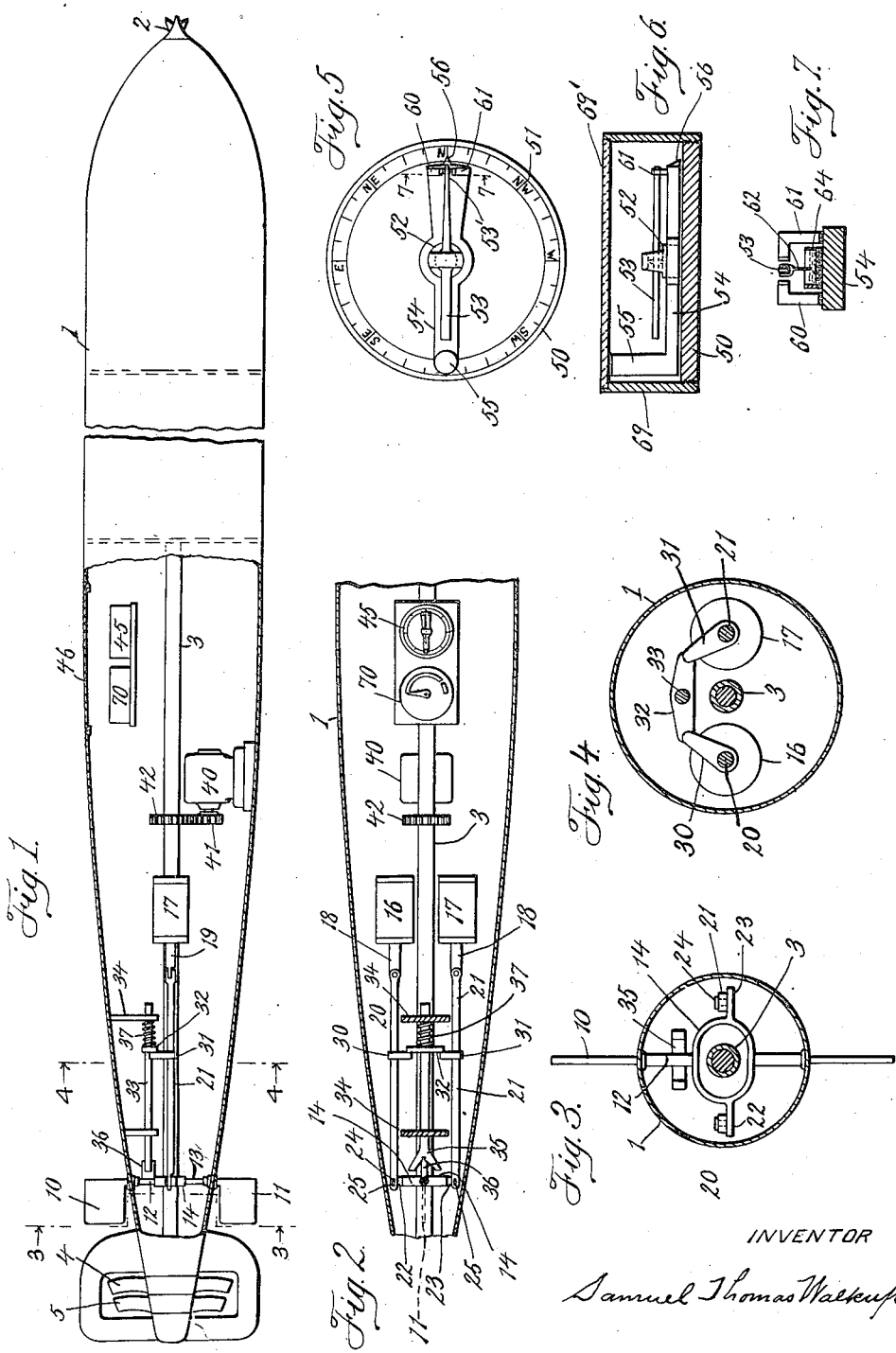

S. T. WALKUP.
AUTOGUBERNATOR.
APPLICATION FILED JULY 30, 1917.

1,378,740.

Patented May 17, 1921.
3 SHEETS—SHEET 3.

Inventor
Samuel Thomas Walkup

UNITED STATES PATENT OFFICE.

SAMUEL THOMAS WALKUP, OF NEW YORK, N. Y.

AUTOGUBERNATOR.

1,378,740.   Specification of Letters Patent.   Patented May 17, 1921.

Application filed July 30, 1917. Serial No. 183,506.

*To all whom it may concern:*

Be it known that SAMUEL THOMAS WALKUP, a born citizen of the United States of America, residing at 3603 Broadway, county of New York, borough of Manhattan, city and State of New York, has invented new and useful Improvements in Autogubernator, of which the following is a specification.

This invention relates to an autogubernator. It is a self guiding or steering means for torpedoes, boats, flying machines or other self propelled devices which operate in the water, on earth or in air, and they follow a predetermined direction from the starting point without manual control.

The object of the invention is to provide a simple means by which the torpedo, motor-boat, aeroplane or other devices can be caused to adhere to the desire course and can be automatically returned to such course upon any deviation from external causes. A further object is to provide means whereby the steering of such self propelled devices in the desired direction can be effected by a compass and can be caused to steer toward a desired point of the compass irrespective of the direction in which it may point when launched.

A further object is to provide means whereby the course of the torpedo boats, aeroplanes, or other devices may be altered automatically after they have traveled for a certain distance, or for a certain length of time.

A further object is to put my autogubernator into immediate and practical use, on motor-boats loaded with high explosives so as to automatically steer them into harbors from a distance of twenty miles and upward. If such harbors are located on inland rivers, compasses should be so mounted and controlled by timing or distance devices, that they change the angle of direction of the self-propelled device and direct said device to the objects to be destroyed.

A still further object is to install it on small explosive carrying aeroplanes which are provided with automatic means for ascending to a predetermined height and for traveling a predetermined length of time in a predetermined direction, and with means for descending at desirable places for the purpose of destroying trenches, fortifications, and other war defences.

For further comprehesion of the invention and of the objects and advantages thereof reference will be had to the following description and accompanying drawings, the various novel features of the invention being more particularly set forth and pointed out in the appended claims.

Figure 1, of the drawings is a side elevation of a marine torpedo with the outer shell or casing partly broken away to show the embodiment of the invention therein.

Fig. 2, is a horizontal sectional view of a portion of the torpedo.

Fig. 3, is a transverse vertical section on the line 3—3 of Fig. 1.

Fig. 4, is a similar view taken on the line 4—4 of Fig. 1.

Fig. 5, is a detail plan view of a compass which controls the rudder.

Fig. 6, is a side elevation thereof.

Fig. 7, is an enlarged detail section on the line 7—7 of Fig. 5, and illustrates particularly the arrangement of the contact devices by which the compass needle controls the rudder.

Fig. 8, is a diagrammatic view of the electric circuit.

Fig. 9, is a detail plan view of a modified adjusting means for the control compass.

Fig. 10, is a detail end view of the adjusting key used in connection with the modification shown in Fig. 9.

Fig. 11, is a diagrammatic view illustrating the control action of a compass on the torpedo.

Fig. 12, is a diagrammatic vertical elevation of an arrangement of the construction, embodying my invention as applied to the vertical steering or maintaining of lateral balance of an aeroplane or other flying or floating devices.

Fig. 13, is a face view of the contact hand of the timing clock.

Fig. 14, is a side view of the fixed contact members of the time clock.

Fig. 15, is a diagram of the wiring circuit of the arrangement shown in Fig. 12.

Fig. 16, is a diagrammatic view of a modified method of controlling the flight of an areoplane or other device.

Figure 17:
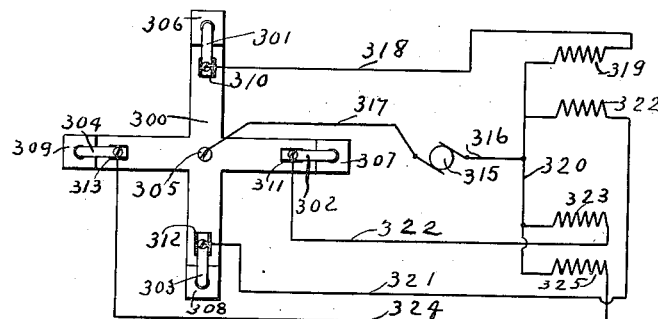
Fig. 17, is top view of detector of altitude variation for an aeroplane and diagrammatice view of electrically controlled means for correcting such variation.

I now refer more particularly to the embodiment of the invention illustrated in Figs. 1 to 7. I have herein shown my invention applied to a marine torpedo of some well known type. However, the invention is not limited in its application to any particular self-propelled device. The torpedo here shown comprises a shell or casing 1, having a detonating point 2, on its forward end and divided into compartments containing the charge of explosives and the motive power mechanism, from which latter a double shaft 3, runs back to a pair of propellers 4 and 5. I have not illustrated in section that portion of the torpedo containing the explosive charge and motive power mechanism, since such illustration is not essential to a proper understanding of the present invention.

The present invention relates to the steering or guiding of a torpedo boat, aeroplane or other self-propelled devices after launching, and it is shown as applied thereto to effect steering in a horizontal plane. As here shown, a pair of vertical rudders 10 and 11 are mounted one above and the other below the casing 1, near the rear end thereof. These rudders are fixed to one another to move in unison, being here shown as fixed to posts 12 and 13 and suitably journaled in the casing and rigidly secured at their inner end to an oval ring 14 which encircles the shaft 3.

Located at a suitable distance in front of the ring 14 are a pair of solenoids 16 and 17, having their cores 18 and 19 connected by rods 20 and 21 to ears 22 and 23 projecting from opposite sides of the ring 14, the connection between the rods and ears being here in the form of pins 24 on the ears passing through longitudinal slots 25 in the ends of the rods.

Fixed to the respective rods 20 and 21 are fingers 30, 31, which engage opposite sides of a collar 32, rigid on a rod 33 which is slidable in any suitable bearings such as indicated at 34 carried by the shell 1. This rod 33 is provided on its rear end with a fork 35 having diverging prongs between which is confined the end of an arm 36 projecting rigidly from the post 12. A coiled spring 37, which encircles the rod 33 and is located between the collar 32 and one of the bearings 34, normally tends to keep the fork 35 pressing against the arm 36, in which position the rudders will be locked in neutral position as will be apparent from Fig. 2 of the drawings. The manner in which the solenoids 16 and 17 act to control the rudder will be referred to in detail later.

The electric current for energizing the solenoids may be obtained from any suitable source. When the device is driven by electric power, the solenoids will naturally be energized from the same source as the driving motor. In the present instance, I have shown a small generator 40 driven from the shaft 3 through the medium of the intermeshing gears 41 and 42.

I shall now describe the compass which controls the energizing of the solenoids 16 and 17 in a manner to cause the steering rudders to hold the torpedo directed toward the point of the compass selected immediately prior to launching of the torpedo, this compass being indicated generally by the numeral 45 in Figs. 1 and 2, and located, adjacent a removable plate 46 in the top of the shell of the torpedo. It is understood that the steering devices of an aeroplane can be controlled in like manner.

In the embodiment of this feature of the invention, illustrated in Figs. 5, 6 and 7, a circular base 50 of copper or any suitable material is provided, on which there are made in reverse order, as indicated at 51, the usual markings indicating the various points of the compass. On the other side of this base is formed a central, circular projection 52 on which is mounted in any well known manner the magnetic needle 53 of the compass. Fitting over the projection 52 closely enough to provide a frictional engagement between contacting surfaces, is a bar 54 provided on one end with a thumb piece or handle 55 for swinging adjustment and on its opposite end with a pointer 56, this bar being located under the needle 53. Mounted upon the last mentioned end of the bar 54, which is adjacent 53', the "north seeking" end of the needle, are a pair of contact posts 60 and 61 suitably insulated from the bar. These posts project up on opposite sides of the end 53' of the needle to which latter is secured a very light, insulated and forked contact strip 62, whose lower end projects into engagement with a small quantity of mercury carried in an insulated container 64 mounted on the bar 54 between the contact posts 60 and 61. As shown in Fig. 6, the compass may be inclosed in a circular casing 69 fastened upon the base 50 and having a glass top 61.

I have not considered it necessary to illustrate and describe the manner in which the solenoids and compass are supported in the torpedo, since the supporting means will be readily supplied by anyone skilled in the art. Since the contact strip carried by the compass needle 53 is of very light construction, I prefer not to have the operating current for the solenoids 16 and 17 pass therethrough, and to this end I wire said contacts into a primary circuit containing a pair of small electromagnets which act as relays, to whose armatures the solenoids are wired in a manner to cause attraction of either armature to close the circuit through the corresponding solenoid. I have indicated these electromagnets numbered 65 and 66 respectively, only in Fig. 8, and they may be located at any suitable point in the casing. When the rudders of devices propelled in the water or the planes of flying machines require considerable power to operate them in a positive manner, reversible motors and usual shifting mechanism and controllers may be substituted for such solenoids as 16 and 17.

As a feature of the present invention, I arrange a timing means which permits the changing of the course of the torpedo or other devices after it has reached a certain point or covered a certain distance in its flight.

This timing means comprises a clock device indicated generally at 70 in Figs. 1 and 2, adjacent the compass 45 and having a contact hand 71 rotated by suitable mechanism. I have not considered it necessary to illustrate the clock mechanism, as any well known mechanism may be employed for this purpose. Secured upon the face of the clock is a pair of fixed contacts 73 and 74, the number of which may be varied, however, according to the use to which the invention is put. These contacts are electrically connected to the solenoids 16 and 17 so as to effect the action thereof as desired.

The electrical connections may be as follows:—

From one terminal of the generator 40 a wire 80 leads to the contact hand 71; and from the opposite terminal each of the wires 81 and 82 leads to one terminal of the solenoids 16 and 17 respectively. From the opposite terminals of the solenoids wires 83 and 84 lead to contact points 85 and 86 adjacent the armatures 67 and 68 of the electromagnets 65 and 66, which armatures are connected by the branched wire 87 to the contact 73 of the clock.

From the generator 40 a branched wire 90 leads to the electromagnets 65 and 66 and from these latter wires 91 and 92 lead to the contact posts 60 and 61. From the mercury contact 64 a wire 93 leads back to the generator. Suitable resistances which are not shown may be placed in the wires 90 and 93 to cut down the current. From clock contact 74 a wire 94 leads to the same terminal of solenoid 17 as the wire 84.

The operation is as follows: The point of the compass toward which the torpedo is to travel having been decided, the bar 54 is swung until its indicator 56 points to its corresponding marking on the base 50. The compass needle 53' is engaged by one of the contact posts 60, 61 and swings with the bar 54, closing a circuit from generator 40 through wire 90, one of the electromagnets 65, 66 and wire 90 or 92, according to which of the contacts 60 and 61 has been bridged, and through wire 93 of the generator. The energizing of the electromagnet 65 or 66 will cause its armature to be attracted, closing a second circuit from the generator through wire 81 or 82 and the corresponding solenoid 16 or 17 and back to the generator through wire 87, contact 73, hand 71 and wire 80. The energizing of the solenoid will cause the fork 35 to be lifted from the arm 36 by the engagement of one of the fingers 30, 31 with the collar 32 on the rod 33. The rudders 10 and 11 will thus be free to be turned by the pulling action of the rod 20 or 21 on the yoke 14. The rudders will remain in adjusted position until the torpedo has swung to the desired direction when the bar 54 will be pointing north and south and the needle will be free between the posts 60 and 61.

When the solenoid is deënergized the fork 35 under pressure of spring 37 will return the rudders to neutral position.

The operation will be readily understood from a consideration of Fig. 11. In this figure, the line N. S. indicates a direction north and south while the torpedo is pointing east but is to be directed northwesterly, indicated by the line N. W. S. E. The bar is swung until its pointer is on the point marked N. W. on the base. The needle 53 will cause the engagement of contact post 60 to bridge the space between the latter and mercury contact 64 by the strip 62. It is obvious that before the circuit through contacts 60 and 64 can open, the torpedo must swing around through an arc of 135° until the needle 53 is pointing north when the torpedo will be pointed north-west, as the position of bar 54 with respect to the torpedo does not change. When it is convenient, the torpedo will naturally be launched pointing in aproximately its direction of travel but it will be obvious that no matter to what point of the compass the torpedo points when it is launched, the rudders will not return to neutral position until the torpedo points in the proper direction.

In certain cases it may be desirable to cause the torpedo to change its direction of travel when it has reached a certain locality, for instance, by continuing its travel in a circular path in such locality. This change of direction of travel is effected by means of a timing device. The contact hand 71 is timed to retain its engagement with the fixed contact 73 during the period of time which has been predetermined as necessary to enable the torpedo to reach the desired locality. During this time, the rudder is under the control of the compass by reason of the connection of contact 73 through wire 87, armatures 67 and 68, and wires 83 and 84 with the solenoids 16 and 17.

When the hand 71 leaves contact 73 and engages contact 74, a circuit is closed from the generator through wire 82, solenoid 17, wire 94, contact 74, hand 71 and wire 80, thus energizing solenoid 17 and turning the rudders. It will be obvious that if wire 94 were connected to solenoid 16 the rudders would be swung in an opposite direction.

As the path of current to either of the solenoids 16 and 17 through the armatures of the electro-magnets 65 and 66 lies through contact 73, it is obvious that the action of the compass has now no effect on the solenoids and that the torpedo will continue to steer in a circular path as long as the hand 71 engages the contact 74. Any well known form of stop device may be provided such as a projection on the face of the contact, if it is desired, to cause the hand to stop rotating while in engagement with the contact.

In Figs. 9 and 10, I have illustrated a modified means for adjusting the control compass. In this modification the bar 54 is replaced by a gear 95 on which is mounted the compass needle 53 and contacts 60, 61 and 64. This gear meshes with a second gear 96, of the same diameter, and fixed to a shaft 97 projecting through the plate 46 and having a key-hole socket 97' in its end. The plate 46 is formed with a mark 98 lying in the same usual plane of the torpedo as the axes of the gears 95 and 96. A key 99, formed with a flange 99', provided with compass markings is inserted in the socket 97 when the torpedo is to be launched, and turned until the desired point on the compass marking registers with the mark 98 on the plate 46. A corresponding angle of adjustment will be given the gear 95 and needle 53 so as to cause the steering of the torpedo in the desired direction.

In Figs. 12, 13 and 14, I have indicated diagrammatically how my invention may be applied to an aeroplane or other flying machines to effect positive steering in a vertical direction.

In Fig. 12, 100 indicates what is known as the elevating plane or "elevator" of an aeroplane, which is suitably pivoted at 101. Fixed rigidly to this plane is an arm 136 engaged by a forked, spring pressed rod 133, carrying a collar 132, which is adapted to be engaged by either one of a pair of fingers 130, 131 fixed to 120 and 121 connecting the plane with the cores 118 and 119 of solenoids 116 and 117, these parts, 136, 133, 132, 130, 131, 120, 121, 118, 119, 116 and 117 corresponding to the parts 36, 33, 32, 30, 31, 20, 21, 18, 19, 16 and 17 previously described. Hung at any convenient point on the aeroplane frame is a pendulum 164 which constitutes a contact similar to the contact 64 and has on opposite sides thereof contacts 160 and 161 corresponding to the contacts 60 and 61. In this embodiment of the invention, the clock face is provided with three contacts, 173, 174 and 175, instead of two; and I do not make use of any electromagnets corresponding to the electromagnets 65 and 66, the wiring circuit being as indicated in Fig. 15.

From a generator 140 or some other suitable source of electric power, wires 181 and 182 lead to the solenoids 116 and 117, and from the latter wires 183 and 184 lead to the contacts 160 and 161. From the pendulum contact 164 a wire 187 leads to contact 174, and from the contact hand 171 of the clock a wire 180 leads to the generator 140. From the contacts 173 and 175 wires 193 and 194 lead to the opposite terminals of solenoids, 116 and 117 from those to which wires 183 and 184 are attached.

When the aeroplane is launched the hand 171 will engage contact 173 and maintain a closed circuit from the generator 140 through wire 183, solenoid 116, wire 193, contact 173, hand 171 and wire 180, thereby tilting the plane 100 in a direction to cause the aeroplane to ascend. As current to either of the solenoids 116 and 117 through the pendulum control can flow only through clock contact 174, it is obvious that the action of the pendulum will have no effect on the solenoids while the hand 171 remains in engagement with contact 173.

When the hand 171 leaves contact 173 and engages contact 174, the circuit through contact 173 is opened and the solenoids come under the control of the pendulum contacts whereby the plane is operated to cause the aeroplane to travel at a constant height.

When the hand 171 leaves contact 174 and engages contact 175, a circuit is closed from the generator 140 through wire 184, solenoid 117, wire 194, contact 175, hand 171 and wire 180, which tilts the plane in a direction to cause the aeroplane to descend, the pendulum control no longer acting for the reasons above pointed out.

It will be obvious of course that the length of the fixed clock contacts will be calculated in degrees according to the time necessary to ascend to the desired height and travel forward to the desired point. In Fig. 13, I have indicated the hand 171 as insulated from the clock shaft by a bushing 200 and formed with an integral collar 202 on which bears a brush 203 to which the wire 180 is connected. It is also obvious that distance devices can be used instead of time devices described herein.

In Fig. 14 I have indicated how the fixed clock contacts 173, 174 and 175 and also 73 and 74 may be constructed in order to effect a substantially instantaneous change of the hand 171 or 71 from one to the other, the hand, which may be of spring steel, pressing down lightly on the contacts and dropping from one to the other.

In Fig. 16, I have shown diagrammatically a modified means for causing the aeroplane to travel a certain length of time. In this modified arrangement, a contact pendulum 210 hangs between a pair of contacts 211 and 212 mounted on a bar 213 horizontally slidable in a fore and aft direction in suitable bearings, indicated at 214. This bar has formed on one side thereof the teeth 215, which are engaged by a worm pinion 216 driven by a clock train 217 of usual construction and provided with any suitable escapement from a spring 218.

When the aeroplane is launched, the contacts 211 and 212 will be in a position to hold the elevative plane at an angle to cause the aeroplane to ascend, these contacts gradually shifting under the influence of the clock train so as to cause the aeroplane to travel in an elongated arc which finally brings it to earth, this mechanism acting through the previously described solenoids and elevating plane, the contacts 210, 211 and 212 corresponding to the contacts 164, 160 and 161 shown in Fig. 12. While I have here illustrated the rods 120 and 121 as connected directly to the elevating plane 100, it will be apparent that such rods could be connected to a rocking lever from which suitable control cables would run to the plane.

It will be understood, of course, that various changes and modifications may be made both in the devices illustrated and in their application without departing from the spirit of the invention. The timing devices may be applied to various types of balancing or steering means such as gyroscopes or other devices.

I have shown that the terrestrial magnetism positively influencing a magnetic needle of a compass is the means I use to predetermine the direction of self-propelled machines. I shall now show clearly how at a predetermined time or distance I can change the direction of a machine controlled by my autogubernator and how I propose to maintain through terrestrial gravity acting upon a pendulum or a liquid the balance or level of an aeroplane after it has reached a predetermined height.

Figure 21:
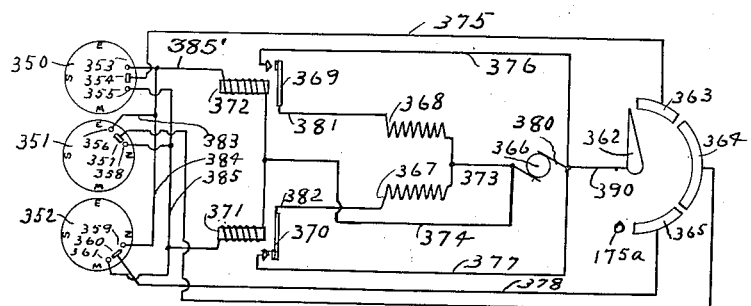
Fig. 21, is a diagrammatic view of compasses and electrically controlled means for predetermining change of direction of self-propelled devices.

Fig. 21, illustrates diagrammatically how I can change as often as is desirable the predetermined direction of a traveling war device. For each direction, I install one mariner's compass which is shown at 350, 351 and 352. Each compass is attached to the war machine at the proper angle for direction so as to cause the machine to move consecutively in the desired directions. As illustrated, compass 350 is attached to the war machine so as to cause it to travel north, compass 351 is attached so as to cause it to move north-east and compass 352 is attached so as to to cause it to travel northwest. 363, 364 and 365 may be contact strips fastened to the face of a clock and 362 is a contact hand which is driven by the clock mechanism and which is a circuit maker for contact strips 363, 364 and 365 respectively. I have not considered it necessary to indicate the mechanism for rotating the hand since any well known type of clock movement may be employed, or if desired, the hand might be driven by a train of reducing gears from the propeller shaft. 366 is the source of electric power. 368 and 367 are solenoids for operating the steering mechanism of a boat or an aeroplane and correspond to 16 and 17 of Figs. 1 and 2. 372 and 371 are electromagnets, and 369 and 370 are circuit makers. Compass 350 controls the initial direction. It is set so as to cause the war machine to move north. Hand 362 is moved so as to close circuit with contact strip 363 and if the traveling war machine, from external causes, changes to right or left from its predetermined direction, the needle 354 will engage either contact 353 or 355 and close a circuit from the generator through wire 390, hand 362, contact 363, wire 375, either wire 385 or 385', magnet 371 or 372 and wire 374 back to generator. The energizing of the electromagnet will close a circuit through the corresponding solenoid 367 or 368. This will be either from generator through wire 377, armature 370, wire 382 solenoid 367 and wire 373; or through wire 376, armature 369, wire 381, solenoid 368 and wire 373. The energizing of the solenoid will cause the rudder to be operated and cause the war machine to return from the right or left to its predetermined course. When time or distance hand 362 is caused to instantly jump from contact strip 363 to contact strip 364, the electric circuits of compass 350 are completely broken, the circuits of compass 351 are brought into operation and the war machine is now compelled to travel in a north-east direction as long as hand 362 remains on contact strip 364. It is not necessary to describe the operation of compass 351, for it is like that of compass 350. When time or distance hand 362 is caused to jump to contact strip 365, both compasses 350 and 351 are inoperative and the direction of travel of the war device is controlled by compass 352, which compels it to go in a north-west direction. It is plain that any number of compasses can be installed and any number of directions can consecutively be predetermined.

Figure 18:
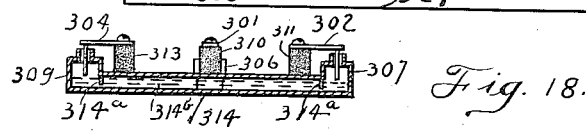
Fig. 18, is vertical sectional view of detector shown in Fig. 17.
Figure 19:
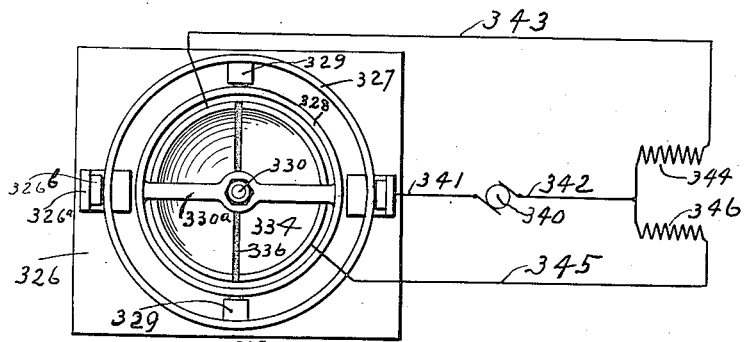
Fig. 19, is top view of preferred form of detector of altitude variation of an aeroplane and diagrammatic view of electrically controlled means for correcting such variation.
Figure 20:
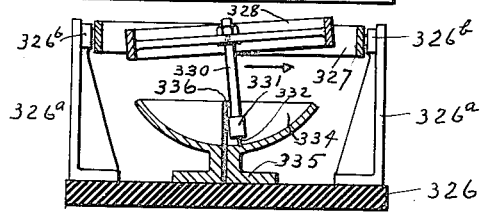
Fig. 20, is vertical section taken on line 20—20 of Fig. 19.

I shall now describe the mechanism by which I intend to control a flying machine in a predetermined plane parallel to the earth. I have shown two devices for obtaining this result. One is illustrated in Figs. 19 and 20. It may be a pendulum swung in gimbals as a mariner's compass or a pendulum controlled by a gyroscopic compass. This pendulum may be attached to the bottom of such a compass and operate with it. Terrestrial gravity keeps the pendulum perpendicular to the earth and it controls the operation of the planes of a flying machine so as to compel it to travel parallel to the earth or in a plane intersecting the pendulum at right angles. The other device for controlling the altitude of an aeroplane is illustrated in Figs. 17 and 18. This device is automatically controlled by terrestrial gravity which causes the surface of a liquid, such as mercury, to remain level with the earth. When the aeroplane deviates from such a level, electric circuits are automatically made which operate mechanism that drives the aeroplane back to a plane level with the liquid and parallel to the earth.

I shall now describe the pendulum shown in Figs. 19 and 20 and its operations.

Fig. 19 shows diagrammatically generator 340, solenoids 344 and 346 and circuits to insulated pendulum 330 and to cup 334 in which the pendulum swings. To the horizontal frame of an aeroplane is attached an insulation base 326 which supports upright frames 326$^a$, 326$^a$ and pendulum cup 334 with its base 335 fastened to 326. 327 is outer gimbal supported at pins 326$^b$, 326$^b$, of frames 326$^a$, 326$^a$. 328 is an inner gimbal supported by pins 329, 329, at right angles to a line intersecting pins 326$^b$, 326$^b$. Pendulum 330 is supported by cross bar 330$^a$ mounted inside of gimbal 328. 331 is a pendulum weight in the center of which is a slidable contact pin 332 with round head so as to freely move inside cup 334 which surface forms contact plates to which wires 343 and 345 are fastened. The surface of the inside of cup 334 is at a distance from the central point from which the pendulum swings, equal to the length of the pendulum. 336 is insulation dividing the cup 334 in equal parts. When the pendulum swings at the insulated center of the inside surface of cup 334, the aeroplane is level with the earth in two directions. Suppose my pendulum is mounted on an aeroplane which is traveling in the direction of the small arrow shown in Fig. 20. Then, cup 334 is rigidly mounted on a horizontal section of the aeroplane so that insulation 336 is in a vertical plane intersecting at right angles the longitudinal center line of the aeroplane. If the aeroplane tilts downward lengthwise as shown in Fig. 20, then cup 334 describes the angle of variation from the level of such aeroplane and the forward or right contact plate forming part of cup 334 comes into contact with pendulum 330 closing circuit to generator 340 through wire 341 and completing the electric circuit through wire 342, solenoid 346, and return wire 345, fastened to forward part of plate 334. 344 and 346 are solenoids which operate the plane which compels the flying machine to return to its longitudinal level the operative connection being as shown in Fig. 12. If the rear end of the aeroplane tilts downward, the cup 334 again describes an angle from the level of the aeroplane, and in like manner already described, solenoid 344 drives the planes of the flying machine to cause it to return to its level. Another pendulum is mounted in the aeroplane, like the one described in all respects except that the insulation dividing the cup is set at right angles to it and in a transverse vertical plane intersecting the aeroplane. This second pendulum operates so that if the aeroplane tilts to its right or left side, solenoids or motors like those already described drive the elevating planes so as to always keep the sides of the flying machine at a predetermined level. It is apparent without further description that two of said solenoids may operate simultaneously, driving an end and a side of the flying machine up to its proper level.

As shown in Figs. 17 and 18, I use mercury to detect the variation of the predetermined altitude at which the ends and sides of an aeroplane must travel and instantly correct such variations by solenoids 323, 325, 319, 322. 300 is a contact holder mounted on horizontal frame of a flying machine. 314 is a glass mercury holder mounted on the frame of a flying machine and parallel to 300. 305 is an insulated contact extending at all times down into the mercury 314$^b$, while 301, 302, 303, 304, are circuit makers with points extending downwardly near the surface of mercury 314$^b$. 306, 307, 308, and 309 are small cups into which the mercury flows past the checks 314$^a$, 314$^a$, which are a part of such cups and serve the purpose of preventing too rapid flow of the liquid. I intend to mount this device so that the vertical plane passing through the center of contacts 302 and 304 coincides with vertical plane passing through the longitudinal center line of an aeroplane, and so that the vertical plane passing through center of contacts 301 and 303 coincides with a vertical plane passing through a transverse section of the flying machine. When the forward end of the machine tilts downward mercury 314$^b$ flows into cup 307 closing circuit with generator 315 through wire 317, contact 305, mercury 314$^b$ and completing circuit through contact 302 wire 322, solenoid 323 and wires 320 and 316 back to generator 315. Solenoid 323 controls the elevating plane of the forward end of the flying machine and compels it to return to its level when the mercury contact with 302 is broken. Like operations occur when the flying machine tilts downward at its rear or over to the right hand or left.

It is plain that I intend to install in vessels for the purpose of carrying high explosives a compass with mercury circuit maker carried by its magnetic needle, a generator for electric current, and two solenoids for operating the rudder to right or left. If change of direction is necessary, two or more compasses are installed for the purposes specified. These vessels are intended to operate automatically for destroying the war machines of the enemy in the open sea or inside harbors.

For automatically operating aeroplanes I intend to install a compass for predetermining direction; a small generator for electric current; two solenoids to control a rudder for steering to right and left; two pendulum and coöperating devices for controlling the longitudinal and lateral balance of an aeroplane so as to maintain altitude by means of four solenoids.

As shown in Fig. 17 the level of the aeroplane may be maintained by mercury closing one or two circuits when the flying machine varies from a predetermined level and thereby causes the proper solenoids to operate so as to maintain such flying machine in the proper position for horizontal flight.

It is possible to cause boats and aeroplanes to be directed so as to send them a predetermined distance and then to re-direct them so as to return them to the place of launching. It is practical to use my autogubernator at night-time, and under favorable weather conditions. In cases where pilots are sent out in war machines at night-time it should be valuable in controlling directions for them.

Having now described my invention, what I claim as new and desire to secure by Letters Patent is:—

1. In a vehicle steering mechanism, a compass, a gear upon which said compass is mounted, a pair of contacts carried by said gear, a second gear in mesh with the first gear and provided with a key socket for turning, located exteriorly of the vehicle casing, and a key having a circular flange marked with the points of the compass adapted to be inserted in said socket, the compass marking on the said flange coöperating with a mark on the vehicle for the purpose set forth.

2. In combination with a directing member of a vehicle, a locking device normally holding said member in neutral position and means acting automatically upon change of direction of said vehicle for operating said directing member, said means in its normal operation acting first to release the said locking device.

3. In combination with a directing member of a vehicle, a locking device normally holding said member in neutral position, means for operating said directing member, said means in its normal operation acting first to release the said locking device, and means acting automatically to return the directing member to neutral position and reapply the locking device.

4. In combination with a device to be guided and a steering member therefor, a pair of solenoids operatively connected to said steering member, means for operating either of said solenoids, means normally locking the steering member in neutral position, the last mentioned means becoming inoperative when either of the solenoids is operated.

5. In combination with a directing member of a vehicle, an oscillatory post connected thereto, an arm operated by said post, a slidably mounted rod having a forked end straddling the end of the said arm, a spring pressing said rod against said arm, a pair of solenoids operatively connected to the said oscillatory post, and means whereby the energizing of either of said solenoids withdraws the said rod from engagement with the said arm.

6. In combination with a directing member of a vehicle, means for operating the latter, and control means for said operating means comprising a pendulum hung electrical contact adapted to make contact with either one of a pair of contacts carried by the vehicle, and means adapted to automatically shift the said contacts, with relation to the said pendulum contact during travel of the vehicle, for the purpose set forth.

In testimony whereof, SAMUEL THOMAS WALKUP has signed his name to this specification in the presence of two subscribing witnesses, this 14th day of June 1917.

SAMUEL THOMAS WALKUP.

Witnesses:
 ALEX CURRIE,
 A. E. SHERIDAN.